INVENTOR.
Walter Silks

May 1, 1962 W. SILKS 3,032,159
LOCK-IN CLUTCH FOR CONTINUOUS MINING MACHINES
Filed Dec. 1, 1959 3 Sheets-Sheet 2

INVENTOR.
Walter Silks
BY

May 1, 1962 W. SILKS 3,032,159
LOCK-IN CLUTCH FOR CONTINUOUS MINING MACHINES
Filed Dec. 1, 1959 3 Sheets-Sheet 3

INVENTOR.
Walter Silks

United States Patent Office 3,032,159
Patented May 1, 1962

3,032,159
LOCK-IN CLUTCH FOR CONTINUOUS MINING MACHINES
Walter Silks, Downers Grove, Ill., assignor to Goodman Manufacturing Company, Chicago, Ill., a corporation of Illinois
Filed Dec. 1, 1959, Ser. No. 856,519
1 Claim. (Cl. 192—114)

This invention relates to continuous mining machines and more particularly relates to an improved form of self-locking clutch for selectively connecting the boring heads of a continuous mining machine to the drive motor therefor.

In continuous mining machines of the boring type, the pumps for supplying fluid under pressure to effect certain operations of the machine are usually driven directly from the motor shaft to operate as long as the motor is in operation, while the boring heads are driven through a selectively operable directly connected clutch of the jaw or splined sleeve type.

Due to the high torque reactions of boring, the reactions against the clutch collar and link and lever arrangement for engaging and disengaging the clutch are so great as to effect disengagement of the clutch against the link and lever shifting mechanism therefor.

This is extremely disadvantageous, particularly where the boring heads are boring in the mine face, making it necessary to back out the machine and free the boring heads before the clutch can again be engaged and the boring heads started in operation.

A principal object of the invention is to remedy the foregoing disadvantages by providing a simple and improved means for holding the clutch connecting the drive motor of a continuous mining machine with the boring heads of the machine from dropping out of engagement as long as the drive motor is operating at a predetermined speed.

A further object of the invention is to provide a simplified form of positive drive clutch for driving the boring heads of a continuous mining machine, in which a centrifugally acting locking means is provided to retain the clutch from dropping out of engagement as long as the drive motor is operating at a predetermined speed, and to accommodate manual disengagement of the clutch below this rated speed.

A further object of the invention is to provide a simplified and improved form of directly connected clutch having a novel form of centrifugal lock for automatically locking the clutch in engagement as long as the driving member for the clutch is operating at a predetermined speed.

These and other objects of the invention will appear from time to time as the following specification proceeds and with reference to the accompanying drawings wherein.

Figure 1:
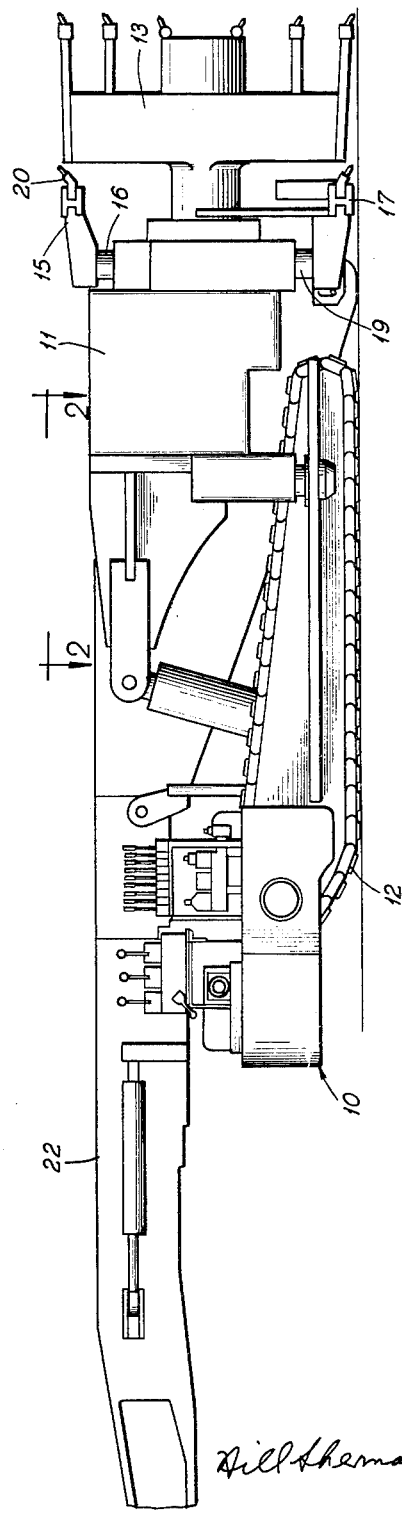
FIGURE 1 is a view in side elevation of a continuous mining machine of the boring type, in which the boring heads of the mining machine are driven through a clutch constructed in accordance with the invention.

In the embodiment of the invention illustrated in the drawings, 10 generally designates a mobile base or main frame having a gear casing or cutter frame 11 extending across the forward end thereof, and mounted on the base 10 in a conventional manner, for vertical adjustment with respect thereto, and for angular adjustment about axes extending transversely of said base frame, and no part of the present invention, so not herein shown or described further.

The base frame 10 is supported on laterally spaced continuous traction tread devices 12, which serve to transport the machine along the ground from working place to working place and to feed boring heads 13, mounted on and projecting forwardly of the gear casing or cutter frame 11, to cut contiguous bores in the working face.

The cutter frame 11 also forms a support for an upper cutter or trimmer bar 15, mounted on said cutter frame on laterally spaced hydraulic jacks 16 and disposed immediately to the rear of the boring heads 13, to cut out the cusps left therebetween. A lower trimmer bar 17, extending parallel to the upper trimmer bar 15 is supported on the cutter frame 11 on hydraulic jacks 19, depending from said cutter frame, and serving to adjust said lower trimmer bar in the proper cutting relation with respect to the ground, and to elevate said trimmer bar above the ground for trimming.

The trimmer bars 15 and 17 have the usual endless cutter chain 20 guided for movement therealong for trimming the upstanding and depending cusps left between the boring heads 13, and driven from drive gearing housed within the cutter frame or gear casing 11 in a manner well known to those skilled in the art, and no part of the present invention so not herein shown or described.

Figure 2:
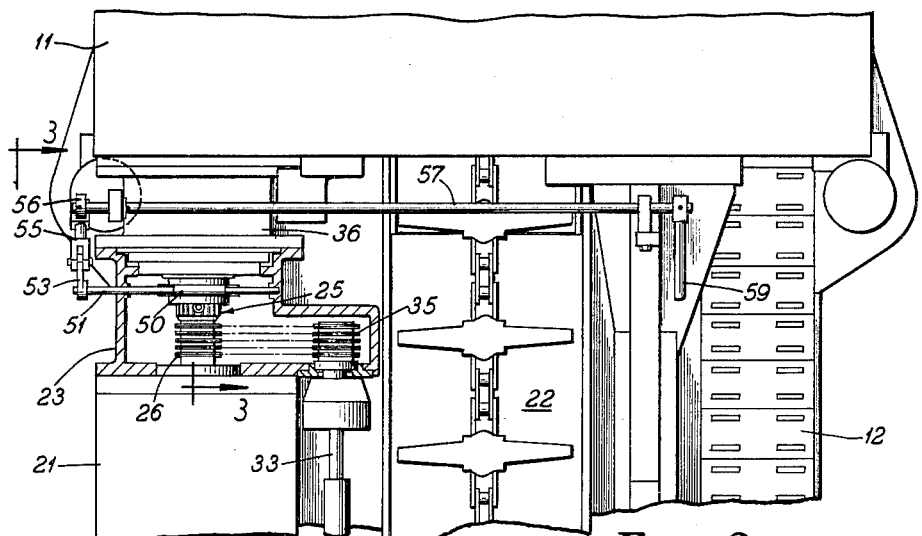
FIGURE 2 is a fragmentary plan view looking substantially along line 2—2 of FIGURE 1, with certain parts broken away and certain other parts shown in horizontal section.
Figure 3:
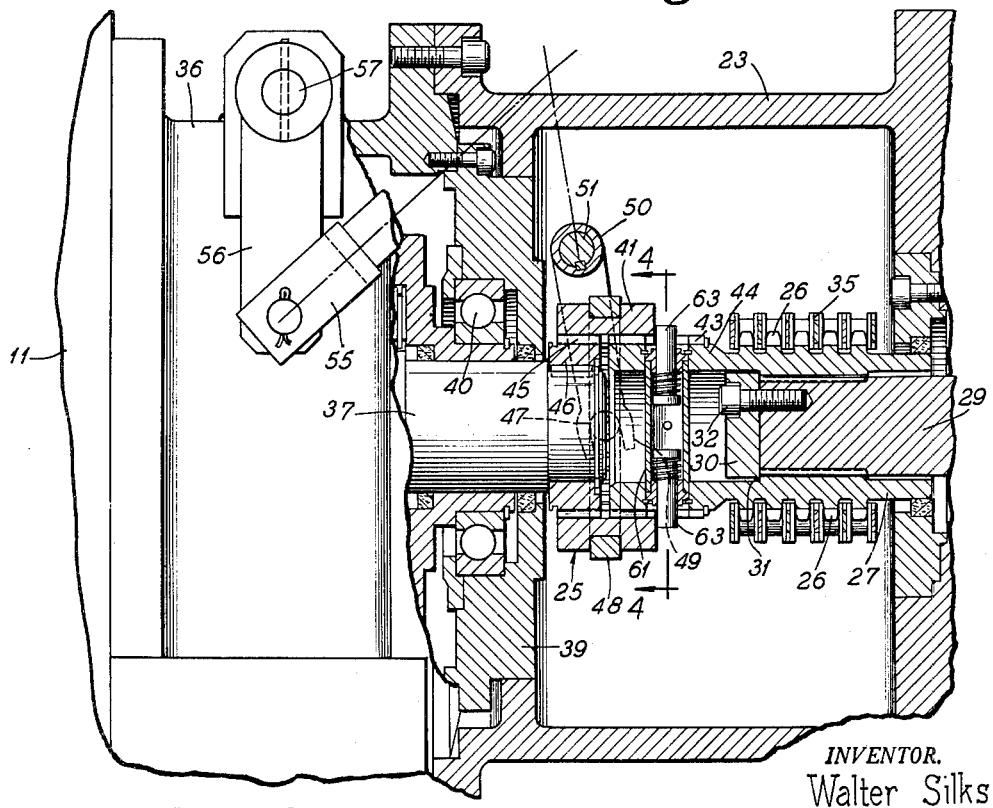
FIGURE 3 is a fragmentary sectional view taken substantially along line 3—3 of FIGURE 2 and showing the clutch in a locked in condition.

Referring now to FIGURES 2 and 3, the cutter frame or gear casing 11 has a motor 21 spaced rearwardly therefrom and mounted thereon for adjustable movement therewith. The motor 21 extends along one side of a conveyor 22, for picking up the mined material and conveying it to the rear of the machine, and has an end housing 23, shown in FIGURES 2 and 3 as being formed integrally with the end plate for said motor, and forming a housing for a clutch or coupling 25, selectively operable to drive reduction gearing (not shown) housed within the gear casing 11, for driving the boring heads 13 and the cutter chain 20. The housing 23 also forms a housing for a plurality of sprockets 26 on a sleeve 27. The sleeve 27 is splined to a shaft 29 for the motor, and retained thereto as by an end retainer cap 30 extending within the sleeve 27 and engaging an internal shouldered portion 31 thereof. The end retainer cap 30 is shown as being secured to the outer end of the motor shaft 29, as by cap screws 32.

The sprockets 26 serve to drive a shaft 33, parallel to the motor shaft 29, and extending along the inner side of the motor 21, through chain and sprocket drives 35. The shaft 33 serves as a drive shaft for the pumps for supplying fluid under pressure to effect the various control operations and hydraulically operated operations of the machine.

The end housing 23 in turn is supported in rearwardly spaced relation with respect to the rear wall of the gear casing or cutter frame 11 on a housing 36, suitably secured to the rear wall of the gear casing 11 and projecting rearwardly therefrom.

Coaxial with the motor shaft 29 and spaced forwardly from the forward end thereof, is a drive shaft 37. The drive shaft 37 is journalled in an end wall 39 for the housing 36 on ball bearings 40, and extends forwardly of said end wall within the housing 36 and into gear casing or cutter frame 11, and serves as a main drive shaft for driving the boring heads 13 and cutter chain 20, in a manner well known to those skilled in the art, so not herein shown or described further.

Figure 5:
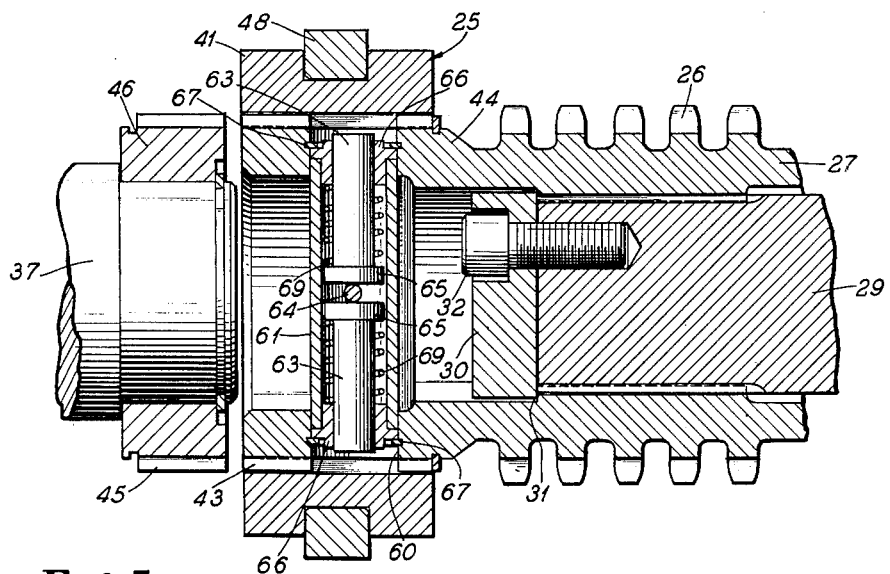
FIGURE 5 is an enlarged fragmentary longitudinal sectional view taken through the clutch, showing the clutch in a disengaged condition.

The clutch 25, for selectively connecting the motor shaft 29 with the shaft 37, includes an internally splined clutch or coupling sleeve 41, having slidable engagement with splines 43 extending externally of an enlarged diameter portion 44 of the sleeve 27, extending in advance of the motor shaft 29 and end cap 30. The coupling sleeve 41 is shiftable along the external splines 43 to engage external splines 45 formed on an annular drive member 46, mounted on the outer end of the drive shaft 37, and keyed or otherwise secured thereto. The coupling sleeve 41 is thus shiftable from the position shown in FIGURE 5 to the position shown in FIGURE 3, to engage the internal splines thereof with the external splines 45 and couple the shaft 29 to the shaft 37 to drive the shaft 37 at the speed of rotation of the shaft 29. The coupling sleeve 41 has a clutch collar 48 recessed therein and suitably journalled therein, to accommodate relative movement between the coupling sleeve 41 and the clutch collar 48. The clutch collar 48 has pins 47 extending horizontally outwardly therefrom in opposite directions, and engaged by the bifurcated lower end portions 49 of a clutch fork 50. The clutch fork 50 is mounted on a transverse rock shaft 51, rockingly mounted in opposite side walls of the housing 23 and shown in FIGURE 2 as extending outwardly from the outer wall thereof. The rock shaft 51 has a lever arm 53 mounted on the outer end thereof and extending upwardly therefrom, and havng a link 55 pivotally connected thereto at one end, and pivotally connected at its opposite end to a lever arm 56 depending from a transversely extending rock shaft 57, spaced inwardly from the cutter frame 11 and extending therealong. A lever 59 on the inner end of the shaft 57 is provided to rock said shaft and move the sleeve 41 into coupled relation with the splines 45 and thereby effect engagement of the clutch. A suitable releasable latch (not shown) may be provided to hold the lever 59 in position.

Figure 4:
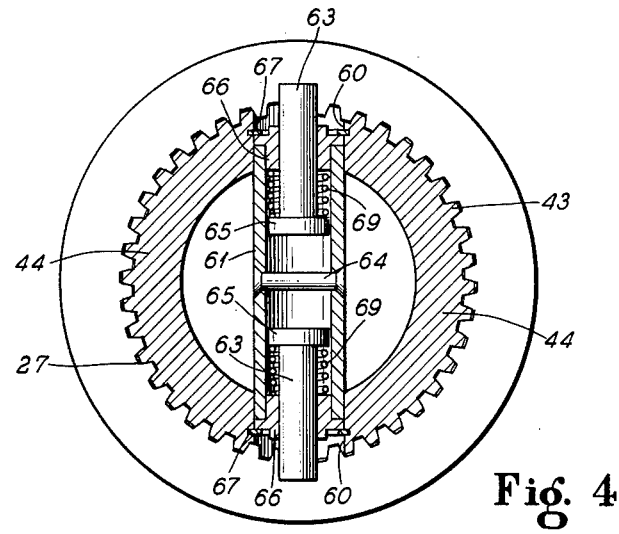
FIGURE 4 is an enlarged fragmentary sectional view taken substantially along line 4—4 of FIGURE 3.

Referring now to the centrifugal lock of the invention, for preventing the torque reactions on the clutch and shifting mechanism therefore, from moving the coupling sleeve 41 to a disengaged position, the enlarged diameter portion 44 of the sleeve 27 is cross-drilled as indicated by reference character 60, and has a guide sleeve 61 mounted in the cross-drilled portions thereof, and extending diametrically across the enlarged diameter portion of said sleeve 27. The guide sleeve 61 has diametrically opposed centrifugally actuated locking members or pins 63 slidably guided therein and limited in inward movement by a transverse stop pin 64, engaged by heads 65 of the locking pins 63 when said pins are in a retracted position. The centrifugal locking pins 63 are guided in flanged collars 66 extending within the guide sleeve 61, with the flanges thereof in abutting engagement with opposite ends of the guide sleeve 61 and retained to said guide sleeve by snap rings 67 or a like retaining means. Compression springs 69 are interposed between the inner ends of the flanged collars 66 and the heads 65 of the centrifugal locking pins 63, to bias said locking pins in retracted relation with respect to the enlarged diameter portion 44 of the sleeve 27, inwardly of the splines thereof, to accommodate free sliding movement of the coupling sleeve 41 along the splines 43 from the disengaged position shown in FIGURE 5 to the fully engaged position shown in FIGURES 3 and 4.

Thus, as the clutch is moved into its engaged position by operation of the clutch operating lever 59, and as the motor 21 approaches its rated speed, the centrifugal locking pins 63 will move outwardly along the guide sleeve 61 against the bias of the compression spring 69 along the inner side of the coupling sleeve 41, to retain said coupling sleeve in a coupled or engaged position, as long as the motor 21 is operating above a predetermined speed. When, however, the motor 21 stops, the springs 61 will return the centrifugal locking pins 63 to their inward biased positions into engagement with the stop pin 64, to accommodate manual release of the clutch.

It may be seen from the foregoing that the drive to the boring heads of continuous mining machines has been improved upon, by the provision of a simplified form of automatic lock-in for the clutch or coupling selectively connecting the motor shaft with the drive shaft for the boring heads, and that the centrifugal locking members are thrown outwardly into position to prevent movement of the clutch coupling sleeve into a disengaged position as long as the drive motor is running up to a predetermined speed, and that when the speed of the motor is reduced below the predetermined speed, the biasing springs for the locking members over-balance the centrifugal forces tending to throw said locking pins outwardly and withdraw the locking pins to accommodate shifting of the coupling sleeve to a disengaged position.

While I have herein shown and described one form in which my invention may be embodied, it may be understood that various modifications and variations in the invention may be effected without departing from the spirit and scope of the novel concepts thereof.

I claim as my invention:

In a clutch, an externally splined driving member, an externally splined driven member adjacent and coaxial with said driving member, an internally splined coupling sleeve having slidable engagement with the splined portion of said driving member and slidably movable therealong into interengagement with the splined portion of said driven member, to effect a drive to said driven member from said driving member, and means preventing the heavy torque loads on said driven member from moving said coupling sleeve out of driving engagement with said driven member comprising at least one locking pin slidably guided in said driving member for movement radially thereof and centrifugally projectable outwardly of said driving member into the path of movement of said coupling sleeve upon rotation of said driving member above a predetermined speed of rotation, means limiting inward movement of said locking pin with respect to said driving member, and a compression spring encircling said locking pin and retractably moving said locking pin out of the path of movement of said clutch coupling sleeve upon a reduction in the speed of rotation of said driving member below said predetermined speed of rotation.

References Cited in the file of this patent

UNITED STATES PATENTS

| | | |
|---|---|---|
| 1,713,909 | Marchev | May 21, 1921 |
| 2,043,692 | Barton | June 9, 1936 |
| 2,198,273 | Reggio | Apr. 23, 1940 |
| 2,735,528 | Dodge | Feb. 21, 1956 |
| 2,783,036 | Lundquist | Feb. 26, 1957 |
| 2,785,783 | Homrig et al. | Mar. 19, 1957 |
| 2,791,309 | Couse | May 7, 1957 |